US011293885B2

(12) United States Patent
Mizuno et al.

(10) Patent No.: US 11,293,885 B2
(45) Date of Patent: Apr. 5, 2022

(54) ANALYZING APPARATUS, ANALYZING METHOD, AND PROGRAM

(71) Applicant: HORIBA, LTD., Kyoto (JP)

(72) Inventors: Yusuke Mizuno, Kyoto (JP); Tomoki Aoyama, Kyoto (JP); Erika Matsumoto, Kyoto (JP)

(73) Assignee: HORIBA, LTD., Kyoto (JP)

( * ) Notice: Subject to any disclaimer, the term of this patent is extended or adjusted under 35 U.S.C. 154(b) by 232 days.

(21) Appl. No.: 16/676,862

(22) Filed: Nov. 7, 2019

(65) Prior Publication Data
US 2020/0209173 A1 Jul. 2, 2020

(30) Foreign Application Priority Data

Dec. 27, 2018 (JP) .............................. JP2018-245040

(51) Int. Cl.
*G01N 23/223* (2006.01)
*G01N 21/86* (2006.01)
(Continued)

(52) U.S. Cl.
CPC ....... *G01N 23/223* (2013.01); *G01N 15/0618* (2013.01); *G01N 21/3563* (2013.01);
(Continued)

(58) Field of Classification Search
CPC ............ G01N 23/223; G01N 23/2204; G01N 23/2206; G01N 15/0618; G01N 21/3563;
(Continued)

(56) References Cited

U.S. PATENT DOCUMENTS

| 9,606,249 | B2 | 3/2017 | Mizuno |
|---|---|---|---|
| 2015/0338534 | A1* | 11/2015 | Mizuno ................ G01N 1/2205 |
| | | | 378/45 |
| 2015/0355084 | A1* | 12/2015 | White ................ G01N 15/1463 |
| | | | 506/35 |

FOREIGN PATENT DOCUMENTS

| CN | 112986300 A | * | 6/2021 | .......... G01N 23/223 |
|---|---|---|---|---|
| JP | H0621866 B2 | * | 3/1994 | ......... G01N 15/0618 |
| JP | 2015219197 A | | 12/2015 | |

OTHER PUBLICATIONS

Kawasaki Heavy Industries—JP-H0621866-B2—Google Patents English Translation obtained Aug. 19, 2021 (Year: 2021).*

* cited by examiner

*Primary Examiner* — David P Porta
*Assistant Examiner* — Jeremy S Valentiner
(74) *Attorney, Agent, or Firm* — Brooks Kushman PC (57) ABSTRACT

An analyzing apparatus includes an X-ray measurement device, an optical characteristic measurement device, and a calculation unit. The X-ray measurement device may be configured to measure fluorescent X-rays generated from the measurement object. The optical characteristic measurement device may be configured to obtain optical characteristics other than the fluorescent X-rays of one or more carbon compounds contained in the measurement object. The calculation unit may be configured to calculate information about a quantity of the one or more carbon compounds contained in the measurement object on the basis of the optical characteristics of the carbon compound(s), and correct the information about fluorescent X-rays measured by the X-ray measurement device on the basis of the information about the quantity of the carbon compound(s).

13 Claims, 8 Drawing Sheets

(51) Int. Cl.
*G01N 15/06* (2006.01)
*G01N 21/3563* (2014.01)
*G01N 23/2206* (2018.01)
*G01N 23/2204* (2018.01)

(52) U.S. Cl.
CPC ......... *G01N 21/86* (2013.01); *G01N 23/2204* (2013.01); *G01N 23/2206* (2013.01); *G01N 2201/063* (2013.01); *G01N 2223/071* (2013.01); *G01N 2223/076* (2013.01); *G01N 2223/1016* (2013.01); *G01N 2223/651* (2013.01)

(58) Field of Classification Search
CPC ............. G01N 21/86; G01N 2201/063; G01N 2223/071; G01N 2223/076; G01N 2223/1016; G01N 2223/651
See application file for complete search history.

ANALYZING APPARATUS, ANALYZING METHOD, AND PROGRAM

CROSS-REFERENCE TO RELATED APPLICATIONS

This application claims priority under 35 U.S.C. § 119 to Japanese Patent Application No. 2018-245040 filed on Dec. 27, 2018. The entire disclosure of Japanese Patent Application No. 2018-245040 is hereby incorporated herein by reference herein.

TECHNICAL FIELD

The present disclosure relates to an analyzing apparatus and an analyzing method for obtaining information about elements contained in a measurement object on the basis of fluorescent X-rays generated from the measurement object, and to a program for allowing a computer to execute the analyzing method

BACKGROUND

Conventionally, there is known a method for analyzing elements contained in a measurement object on the basis of fluorescent X-rays generated from the measurement object.

For example, there is known an apparatus that collects particulate matter (e.g. PM2.5) included in the atmosphere with a collection filter, and analyzes elements contained in the particulate matter on the basis of fluorescent X-rays generated from the collected particulate matter as generally described in JP2015-219197 (U.S. Pat. No. 9,606,249 B2). This apparatus can perform continuous analysis by collecting particulate matter at predetermined times or intervals.

SUMMARY

Technical Problem

In element analysis of a measurement object using fluorescent X-rays, the element analysis may not be performed correctly due to phenomenon in which the measurement object itself absorbs fluorescent X-rays generated from the measurement object (self-absorption). For instance, if a main component of the measurement object is a carbon compound, like particulate matter, it may be difficult to correctly analyze elements other than carbon contained in the measurement object due to self-absorption caused by the carbon compound.

Note that, as with the carbon compound described above, there are various substances such as black carbon, organic carbon, and brown carbon, which contain carbon as a main component element but have different chemical structures and properties. For instance, particulate matter generated by open burning contains organic carbon as a main component.

In addition, it is difficult to correctly quantify a carbon compound contained in a measurement object, and to correctly grasp influence of self-absorption caused by the carbon compound. As a result, it is difficult or not possible to accurately correct fluorescent X-rays detected by an X-ray detector so as to accurately analyze elements contained in the measurement object.

Various embodiments according to the present disclosure calculate information about the quantity of one or more carbon compounds contained in the measurement object and correct information about fluorescent X-rays on the basis of the information about the quantity of the one or more carbon compounds from element analysis based on fluorescent X-rays generated from the measurement object.

Technical Solution

A plurality of aspects are given below as means for solving the problem. These aspects can be arbitrarily combined as necessary although combinations may not be described or illustrated herein.

An analyzing apparatus according to one aspect of the present disclosure is an apparatus for obtaining information about elements contained in a measurement object on the basis of fluorescent X-rays generated from the measurement object. The analyzing apparatus includes an X-ray measurement device, an optical characteristic measurement device, and a calculation unit.

The X-ray measurement device measures fluorescent X-rays. The optical characteristic measurement device obtains optical characteristics of one or more carbon compounds contained in the measurement object.

A calculation unit, such as a programmed microprocessor, application specific integrated circuit (ASIC), or similar hardware or software module, calculates information about quantity of the carbon compound contained in the measurement object on the basis of the optical characteristics of the carbon compound. The calculation unit corrects information about fluorescent X-rays measured by the X-ray measurement device on the basis of the information about quantity of one or more carbon compounds.

In this way, information about quantity of the one or more carbon compounds contained in the measurement object can be correctly calculated on the basis of the optical characteristics of the carbon compound(s), while the information about fluorescent X-rays affected by self-absorption caused by the carbon compound(s) can be accurately corrected on the basis of information about quantity of the carbon compound(s) calculated using the optical characteristics.

The optical characteristic measurement device may include a sensor configured to measure optical characteristics of the measurement object. In this way, optical characteristics of the carbon compound contained in the measurement object can be measured.

The sensor may be an image sensor configured to obtain image data of the measurement object. In this way, a wide range of optical characteristics of the measurement object can be obtained as image data.

The optical characteristic measurement device may include a light filter disposed between the image sensor and the measurement object. In this way, optical characteristics of the carbon compound in a specific wavelength region can be obtained.

The optical characteristic measurement device may include a light source configured to irradiate the measurement object with light. In this way, clearer optical characteristics of the carbon compound can be obtained.

The light source may be a white color light source. In this way, optical characteristics of the carbon compound in a wide wavelength region can be clearly obtained.

The calculation unit may calculate content of black carbon contained in the measurement object on the basis of the optical characteristics of the carbon compound in a visible light region. In this way, information about fluorescent X-rays generated from the measurement object can be corrected on the basis of content of black carbon contained in the measurement object.

The calculation unit may calculate content of organic carbon contained in the measurement object on the basis of the optical characteristics of the carbon compound in the visible light region. In this way, content of the organic carbon can be calculated on the basis of optical characteristics in the visible light region, in a case where the content ratio of the organic carbon is large, for example.

The calculation unit may calculate content of the organic carbon contained in the measurement object on the basis of the optical characteristics of the carbon compound in infrared region. In this way, information about fluorescent X-rays generated from the measurement object can be corrected on the basis of content of the organic carbon contained in the measurement object.

The calculation unit may calculate content of the black carbon contained in the measurement object on the basis of the optical characteristics of the carbon compound in infrared region. In this way, content of the black carbon can be calculated on the basis of optical characteristics in infrared region, in a case where the content ratio of the black carbon is large, for example.

The analyzing, apparatus described above may further include a collection filter configured to collect a measurement object. In this way, elements contained in the measurement object can be analyzed in a state collected by the collection filter.

An analyzing method according to another aspect of the present disclosure is a method for obtaining information about elements contained in a measurement object on the basis of fluorescent X-rays generated from the measurement object. The analyzing method may include: detecting fluorescent X-rays, obtaining optical characteristics other than the fluorescent X-rays of a carbon compound contained in the measurement object, calculating, by a programmed processor and/or other hardware, information about a quantity of the carbon compound contained in the measurement object on the basis of the optical characteristics of the carbon compound, and correcting information about the fluorescent X-rays on the basis of the information about the quantity of the carbon compound.

In this way, the information about the quantity of the carbon compound contained in the measurement object can be correctly calculated on the basis of the optical characteristics of the carbon compound, while information about the fluorescent X-rays can be accurately corrected on the basis of the information about the quantity of the carbon compound calculated using the optical characteristics.

A non-transitory computer readable storage product having stored data representing a program according to still another aspect of the present disclosure includes instructions, data, and/or a program causing a microprocessor or computer to perform the analyzing method described above One or more embodiments according to the disclosure may provide various advantages. For example, when obtaining information about elements contained in a measurement object on the basis of fluorescent X-rays generated from the measurement object, information about a quantity of a carbon compound contained in the measurement object can be correctly calculated on the basis of the optical characteristics of the carbon compound, while information about fluorescent X-rays can be accurately corrected on the basis of the information about the quantity of the carbon compound calculated using the optical characteristics.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

First Embodiment

Figure 1:
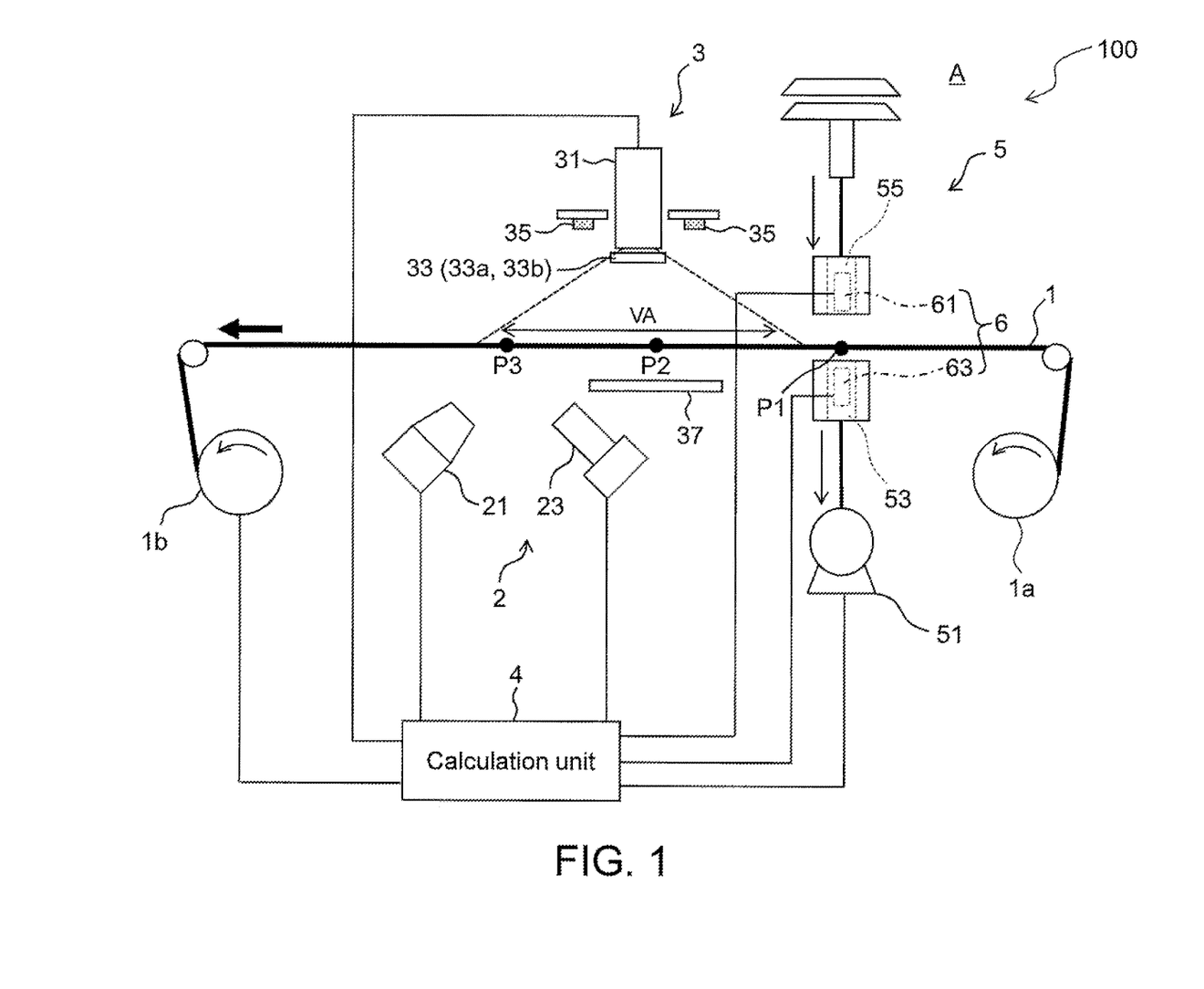
FIG. 1 is a diagram illustrating a structure of an analyzing apparatus according to one or more embodiments.

With reference to FIG. 1, a structure of an analyzing apparatus 100 according to a first embodiment is described. FIG. 1 is a diagram illustrating a structure of the analyzing apparatus. The analyzing apparatus 100 according to the first embodiment is an apparatus that collects particulate matter (e.g. fine particles such as PM2.5) floating in the air, and analyzes elements contained in the particulate matter. In other words, a main measurement object of the analyzing apparatus 100 of this embodiment is particulate matter.

Therefore, the analyzing apparatus 100 is disposed at or in a vicinity of a source of particulate matter, for example, so as to analyze particulate matter generated from the source or the like. For instance, the analyzing apparatus 100 is disposed along or in a vicinity of a road with heavy traffic (a main road, a highway, etc.), or in a factory area that can generate particulate matter or in a vicinity thereof.

The analyzing apparatus 100 according to the first embodiment includes a collection filter 1 configured to collect particulate matter floating in the air, an X-ray measurement device 2 configured to measure fluorescent X-rays generated from the particulate matter collected by the collection filter 1, an optical characteristic measurement device 3 configured to obtain optical characteristics of carbon compound contained in the particulate matter collected by the collection filter 1, and a calculation unit 4.

The collection filter 1 is, for example, a white color tape-like member including a reinforcement layer and a collection layer laminated on the reinforcement layer. The reinforcement layer is made of nonwoven fabric of polymeric material (such as polyethylene), for example. The collection layer has pores capable of collecting particulate matter (FP or PM) (having a grain diameter of 2.5 µm or smaller). The collection layer is made of a fluorocarbon resin material, for example. A region of the collection filter 1 in which the particulate matter is collected is referred to as a "collection region". One layer of glass filter, one layer of fluorocarbon resin material filter, or the like can be used as the collection filter 1.

The collection filter 1 is sent out from a delivery reel 1a and is wound up by a winding-up reel 1b, so that the collection filter 1 can move in the length direction (the direction shown by a thick arrow in FIG. 1).

As illustrated in FIG. 1, the analyzing apparatus 100 is provided with a collection unit 5 disposed at a position corresponding to a first position P1 on the upstream side in a movement direction of the collection filter 1, in the length direction of the collection filter 1. The collection unit 5 includes a suction pump 51, a suction port 53, and an exhaust port 55.

The suction pump 51 is capable of generating a suction force in the suction port 53. The suction port 53 having the suction force allow the exhaust port 55 to exhaust air A toward the first position P1 of the collection filter 1, so that the particulate matter contained in the air A is collected in the collection region.

The X-ray measurement device 2 is disposed at a third position P3 on the downstream side of the first position P1 in the movement direction of the collection filter 1. The X-ray measurement device 2 is an apparatus that irradiates the particulate matter at the third position P3 with X-rays, so as to measure fluorescent X-rays generated from the particulate matter.

Specifically, the X-ray measurement device 2 includes an X-ray source 21 and a detector 23. The X-ray source 21 emits X-rays to the particulate matter collected by the collection filter 1 at the third position P3. The X-ray source 21 is, for example, a device that generates X-rays by irradiating metal such as palladium with an electron beam.

The detector 23 detects fluorescent X-rays generated from the particulate matter irradiated with the X-rays from the X-ray source 21. The fluorescent X-rays detected by the detector 23 are used for element analysis of the particulate matter. The detector 23 is a device capable of measuring X-rays, such as a silicon semiconductor detector or a silicon drift detector, for example.

The optical characteristic measurement device 3 is disposed at a second position P2 between the first position P1 and the third position P3 in the length direction of the collection filter 1. The optical characteristic measurement device 3 is an apparatus that obtains optical characteristics of carbon compound contained in the particulate matter. The "optical characteristics" obtained by the optical characteristic measurement device 3 may include characteristics of light having ultraviolet to infrared wavelength region wavelengths (or frequencies), and wavelengths in the gamma-ray wavelength region, but not characteristics of X-rays, i.e. not having wavelengths in the X-ray wavelength region. The X-ray wavelength region means, for example, a region from 10 pm (pica-meter) to 10 nm. The ultraviolet to infrared wavelength region means, for example, a region from 10 nm to 1 m. The gamma-ray wavelength region means, for example, a region having a wavelength of 10 pm or less, including a region having a wavelength from 1 pm to 10 pm.

In this embodiment, the optical characteristic measurement device 3 includes an image sensor 31, a light filter 33, and a light source 35. The image sensor 31 is disposed at the second position P2 in the length direction of the collection filter 1 so that a light receiving surface of the image sensor 31 faces a surface of the collection filter 1 on the side where the particulate matter FP is collected. The image sensor 31 is, for example, a two-dimensional sensor that obtains two-dimensional image data of the particulate matter FP collected by the collection filter 1 at the second position P2.

This image sensor 31 is, for example, a CCD image sensor in which charge coupled devices (CCDs) are arranged in a two-dimensional array, or a CMOS image sensor in which light receiving elements are arranged in an array. In addition, the image sensor 31 is equipped with an optical member such as a wide-angle lens, so that image data of a wide field of view region VA (FIG. 1) can be obtained.

The light filter 33 is disposed between the light receiving surface of the image sensor 31 and the collection filter 1 in the height direction, and transmits only light in a specific wavelength region from the collection filter 1 (the particulate matter at the second position P2) to enable the image sensor 31 to receive the light in the specific wavelength region. In this embodiment, the light filter 33 includes a visible light filter 33a and an infrared light filter 33b. Note that the visible light filter 33a and the infrared light filter 33b can be switched manually or automatically and can be disposed between the light receiving surface of the image sensor 31 and the collection filter 1. The visible light filter 33a is a filter that transmits light in the visible light region. When the visible light filter 33a is disposed between the light receiving surface of the image sensor 31 and the collection filter 1, the image sensor 31 can obtain image data of the collection filter 1 (the particulate matter) in the visible light region (visible light image data).

As described below, the visible light image data represents a "blackness" of the collection filter 1 at the second position P2. Therefore, on the basis of the "blackness" of the visible light image data, it is possible to calculate the content of the black carbon (black color carbon compound) contained in the particulate matter collected by the collection filter 1 at the second position P2.

Organic carbon also has optical characteristics in the visible light region, but intensity thereof is generally weak. Therefore, if the particulate matter contains black carbon, optical characteristics of the organic carbon in the visible light region can be hardly recognized in the visible light image data due to an influence of the black carbon. In contrast, if the particulate matter contains little black carbon and therefore a content ratio of the organic carbon is high, the influence of the black carbon in the visible light region is small, and optical characteristics of the organic carbon in the visible light region can be recognized in the visible light image data. Therefore, if it is considered that the particulate matter contains little black carbon, content of the organic carbon can be calculated on the basis of the visible light image data.

The infrared light filter 33b is a filter that transmits light in the infrared region. When the infrared light filter 33b is disposed between the light receiving surface of the image sensor 31 and the collection filter 1, the image sensor 31 can obtain image data of the collection filter 1. (the particulate matter) in the infrared region (infrared image data). The infrared image data represents infrared light intensity generated from the second position P2 of the collection filter 1. In addition, the organic carbon (molecules containing carbon as a main component) absorbs infrared light in a specific wavelength (region) due to the existence of its functional group. Therefore, content of the organic carbon contained in the particulate matter collected by the collection filter 1 at the second position P2 can be calculated on the basis of the infrared light intensity indicated by the infrared image data. The organic carbon may include, for example brown carbon, aromatic hydrocarbon, unsaturated hydrocarbon, and the like. Each type of the organic carbon has specific optical characteristics. Note that the wavelength region in which the infrared light intensity should be obtained as the infrared image data can be determined depending on what type of organic carbon can be contained in the particulate matter, on the basis of the source of the particulate matter FP or the like.

The black carbon also has optical characteristics in the infrared region, but intensity thereof is generally weak. Therefore, if the particulate matter contains a much larger amount of organic carbon than that of black carbon, optical characteristics of the black carbon in the infrared region can be hardly recognized in the infrared image data due to an influence of the organic carbon. In contrast, if the particulate matter contains little organic carbon and therefore a content ratio of the black carbon is high, the influence of the organic carbon in the infrared region is small, and optical characteristics of the black carbon in the infrared region can be recognized in the infrared image data. Therefore, if it is considered that the particulate matter contains little organic carbon, content of the black carbon can be calculated on the basis of the infrared image data.

Figure 2:
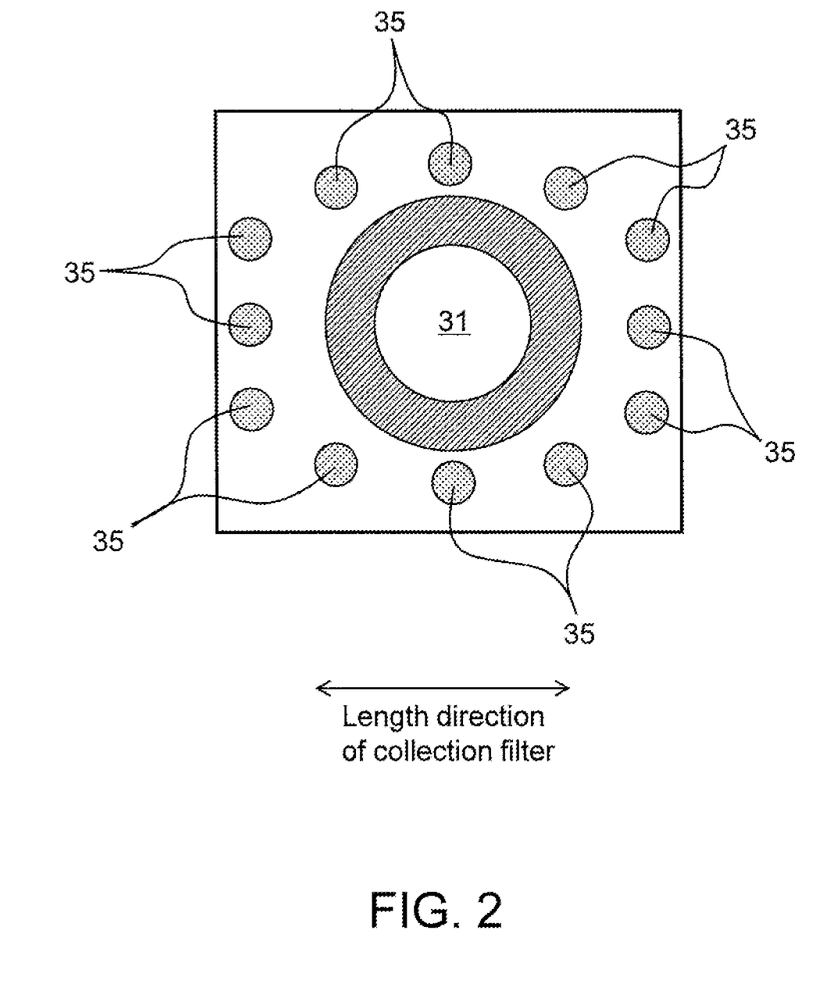
FIG. 2 is a diagram illustrating one example of arrangement of a plurality of light sources.

A plurality of the light sources 35 are disposed so that the field of view region VA of the image sensor 31 is uniformly irradiated. Specifically, as illustrated in FIG. 2, the plurality of light sources 35 is disposed on a substrate, with predetermined spaces along an ellipse with a major axis parallel to the length direction of the collection filter 1. FIG. 2 is a diagram illustrating one example of an arrangement of the plurality of light sources. This arrangement of the light sources 35 enables irradiation of the collection filter 1 with light uniformly in wide range in the length direction. Length of the major axis and/or length of the minor axis of the ellipse along which the plurality of light sources 35 are arranged can be arbitrarily determined in accordance with an aspect ratio of the field of view region VA or the like. In addition, the plurality of light sources 35 can be arranged on the periphery of an arbitrary shape other than an ellipse in accordance with a shape or the like of the field of view region VA. By arranging the light sources 35, it is possible to obtain clearer image data of the collection filter 1 at the second position P2. In this embodiment, the light source 35 is, for example, a surface mount type white color LED. Using the white color light source as the light source 35, it is possible to emit light having a wide range of wavelengths to the collection filter 1 at the second position P2. As a result, it is possible to obtain clear image data representing optical characteristics of carbon compound in a wide wavelength region.

As illustrated in FIGS. 1 and 2, the substrate on which the light sources 35 are mounted is provided with an opening smaller than the ellipse along which the plurality of light sources 35 is arranged. The image sensor 31 is disposed so that its light receiving surface protrudes from the opening.

As illustrated in FIG. 1, the optical characteristic measurement device 3 may include a plate-like member 37. The plate-like member 37 is disposed on the side opposite to the surface of the collection filter 1 facing the image sensor 31 in the field of view region VA, when the image sensor 31 obtains image data of the collection filter 1. Note that the plate-like member 37 can have any thickness like a thick plate or a thin film, for example, as long as it does not transmit too much light. When obtaining image data of the collection filter 1 (the particulate matter), by disposing the plate-like member 37, image data of the collection filter 1 (the particulate matter) can be better clarified.

As another embodiment, it is possible to use a material such as a black color nonreflective sheet having a high light absorption rate (e.g. 99.99% light absorption rate) as the plate-like member 37. Using such a member having a high light absorption rate as the plate-like member 37, it is possible to avoid reflected light which occurs when the light generated from the light source 35 is reflected by another member, for example.

Figure 3:
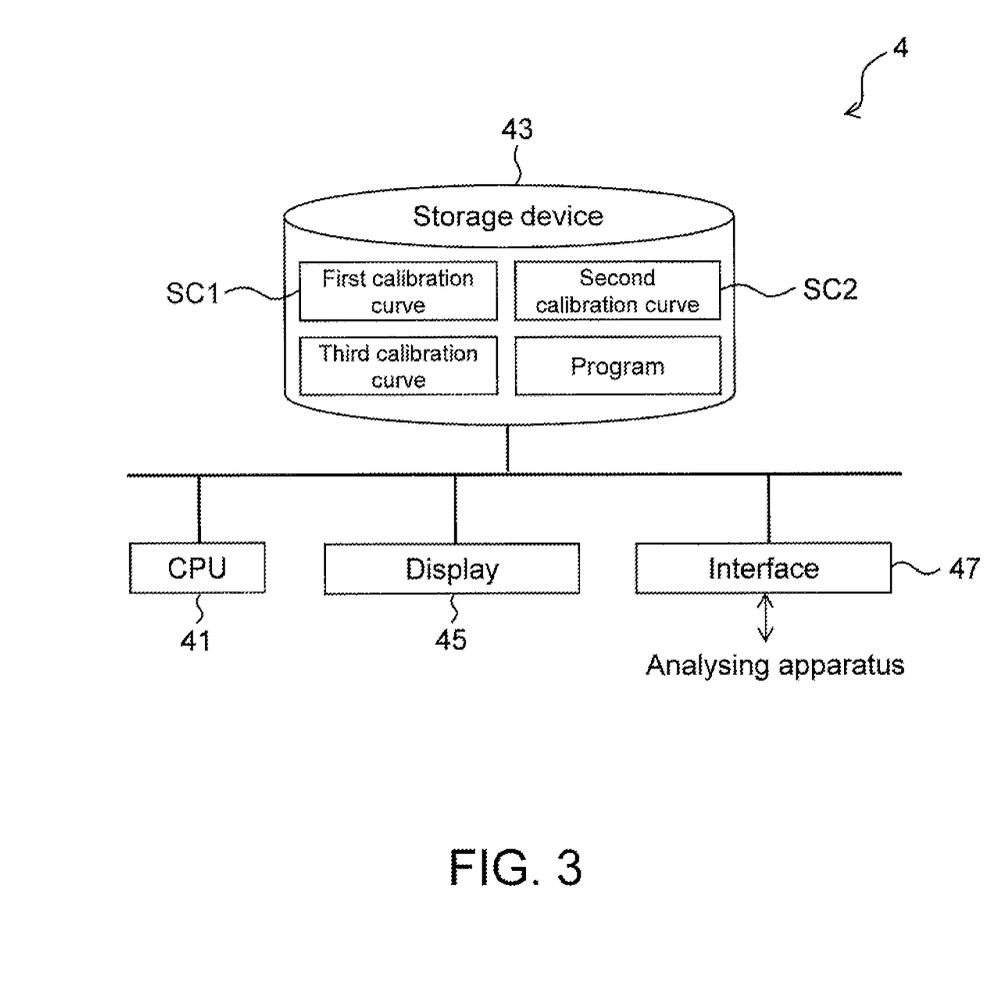
FIG. 3 is a diagram illustrating a structure of a calculation unit.

As illustrated in FIG. 3, the calculation unit 4 may be implemented by a computer system including a CPU 41, a storage device 43 such as a RAM or a ROM, a display 45 (such as a liquid crystal display), and various types of interfaces 47 (such as an I/O port and a communication interface) that perform input and output of data and signals with individual portions of the analyzing apparatus 100, signal conversion, and the like. FIG. 3 is a diagram illustrating a representative structure of a calculation unit 4 as described with respect to various embodiments. The calculation unit 4 may perform control of individual portions of the analyzing apparatus 100 and calculations using data obtained by individual portions of the analyzing apparatus 100 (such as data of fluorescent X-rays and data obtain by the optical characteristic measurement device 3 (the image data described above)).

Specifically, in various embodiments, the calculation unit 4 controls the optical characteristic measurement device 3 to obtain data representing optical characteristics of the particulate matter collected by the collection filter 1 at the second position P2 (the image data (the visible light image data or the infrared image data) in this embodiment), and from the data, it calculates information about quantity of carbon compound contained in the particulate matter. In this embodiment, the calculation unit 4 calculates carbon compound content contained in the particulate matter as the information about the quantity of the carbon compound. In addition, the calculation unit 4 may control the X-ray measurement device 2 to obtain fluorescent X-rays generated from the particulate matter collected by the collection filter 1 at the third position P3, as a fluorescent X-ray spectrum in which energy of the fluorescent X-rays and intensity of the fluorescent X-rays at each energy are associated with each other.

In this embodiment, on the basis of the information about the quantity of one or more carbon compounds calculated from the image data, the calculation unit 4 calculates degree of self-absorption of fluorescent X-rays caused by the carbon compound(s) contained in the particulate matter at the third position P3, and on the basis of this degree of the self-absorption, the calculation unit 4 corrects information about the obtained fluorescent X-ray spectrum. In this embodiment, the calculation unit 4 corrects intensity of the obtained fluorescent X-ray spectrum as the information about the obtained fluorescent X-ray spectrum. After that, the calculation unit 4 performs quantification of elements contained in the particulate matter FP on the basis of energy value at which an intensity peak exists in the fluorescent X-ray spectrum having the corrected intensity. Note that the control and calculation described above may be realized by a program stored in the storage device 43 of the calculation unit 4 and executed by the CPU 41 of the calculation unit 4. In addition, it is also possible to realize a part of the control and calculation described above by hardware of the calculation unit 4.

As also illustrated in FIG. 1, the analyzing apparatus 100 may include a collection amount measurement unit 6. The collection amount measurement unit 6 may be configured to measure a collection amount of the particulate matter collected by the collection filter 1 at the first position P1. Specifically, the collection amount measurement unit 6 may include a beta-ray source 61 and a beta-ray detector 63. The beta-ray source 61 is disposed inside the exhaust port 55, so as to emit beta-rays toward the first position P1. The beta-ray detector 63 is disposed inside the suction port 53 so as to face the beta-ray source 61, and measures intensity of the beta-ray after passing through the collection region. The collection amount of the particulate matter collected at the first position P1 can be calculated as mass concentration of the particulate matter on the basis of beta-ray intensity measured by the beta-ray detector 63.

Figure 4:
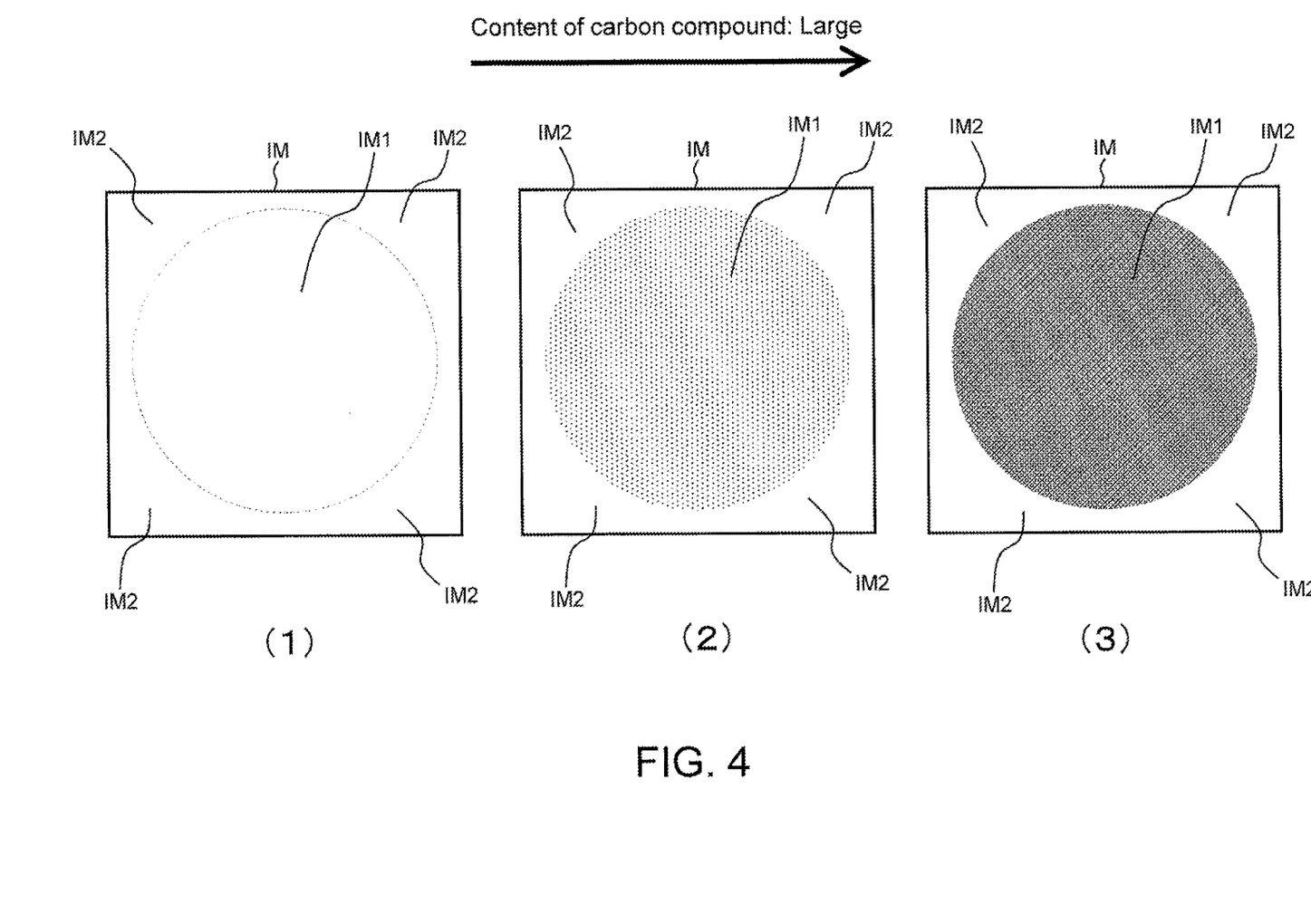
FIG. 4 is a diagram illustrating examples of image data of particulate matter collected by the collection filter.

Content of a carbon compound (black carbon and organic carbon) contained in the particulate matter may be calculated on the basis of image data obtained by imaging the particulate matter collected by the collection filter 1. For example, when disposing the visible light filter 33a in front of the image sensor 31 so that the image sensor 31 obtains image data in the visible light region (visible light image data), two-dimensional image data (1) to (3) shown in FIG. 4 are obtained. FIG. 4 is a diagram illustrating examples of image data of the particulate matter collected by the collection filter.

The image data IM (1) to (3) shown in FIG. 4 are obtained by changing the collection amount of the particulate matter by the collection filter 1. The image data (1) in FIG. 4 show a case where no or little particulate matter is collected, the image data (3) in FIG. 4 show a case where the collection amount of the particulate matter is large, and the image data (2) in FIG. 4 show a case where the collection amount of the particulate matter is medium between the image data (1) and (3). In this way, in the image data obtained by the image sensor 31, as the collection amount of the particulate matter becomes larger, "luminance" at the collection region of the collection filter 1 becomes lower. Further, in addition to a part in which the luminance changes along with the collection amount of the particulate matter (referred to as first image data IM1), the image data IM contains a part in which the luminance hardly changes along with the collection amount of the particulate matter (referred to as second image data IM2). The first image data IM1, in which the luminance changes depending on the collection amount, corresponds to the collection region in which the particulate matter is collected. Specifically, in the image data IM, the first image data IM1 corresponds to a part that includes the center part of the collection filter 1 relative to a whole surface of the collection filter 1. On the other hand, the second image data IM2 in which the luminance hardly changes depending on the collection amount corresponds to a part of the collection filter 1 in which the particulate matter is not collected. Specifically, in the image data IM, the second image data IM2 corresponds to a region other than the collection region relative to a whole surface of the collection filter 1. In this way, the first image data IM1 and the second image data IM2 are included in the image data IM obtained by the image sensor 31, and thus the part of the collection filter 1 in which the particulate matter is collected can be easily distinguished from the part in which the particulate matter is not collected. In addition, integrating luminance values of pixels included in the first image data IM1 in the image data IM shown in FIG. 4, and making a relationship between the integrated value and the collection amount of the particulate matter into a graph, the graph becomes as shown in FIG. 5, which is a diagram showing a relationship between the luminance integrated value of the first image data and the collection amount of the particulate matter.

Figure 5:
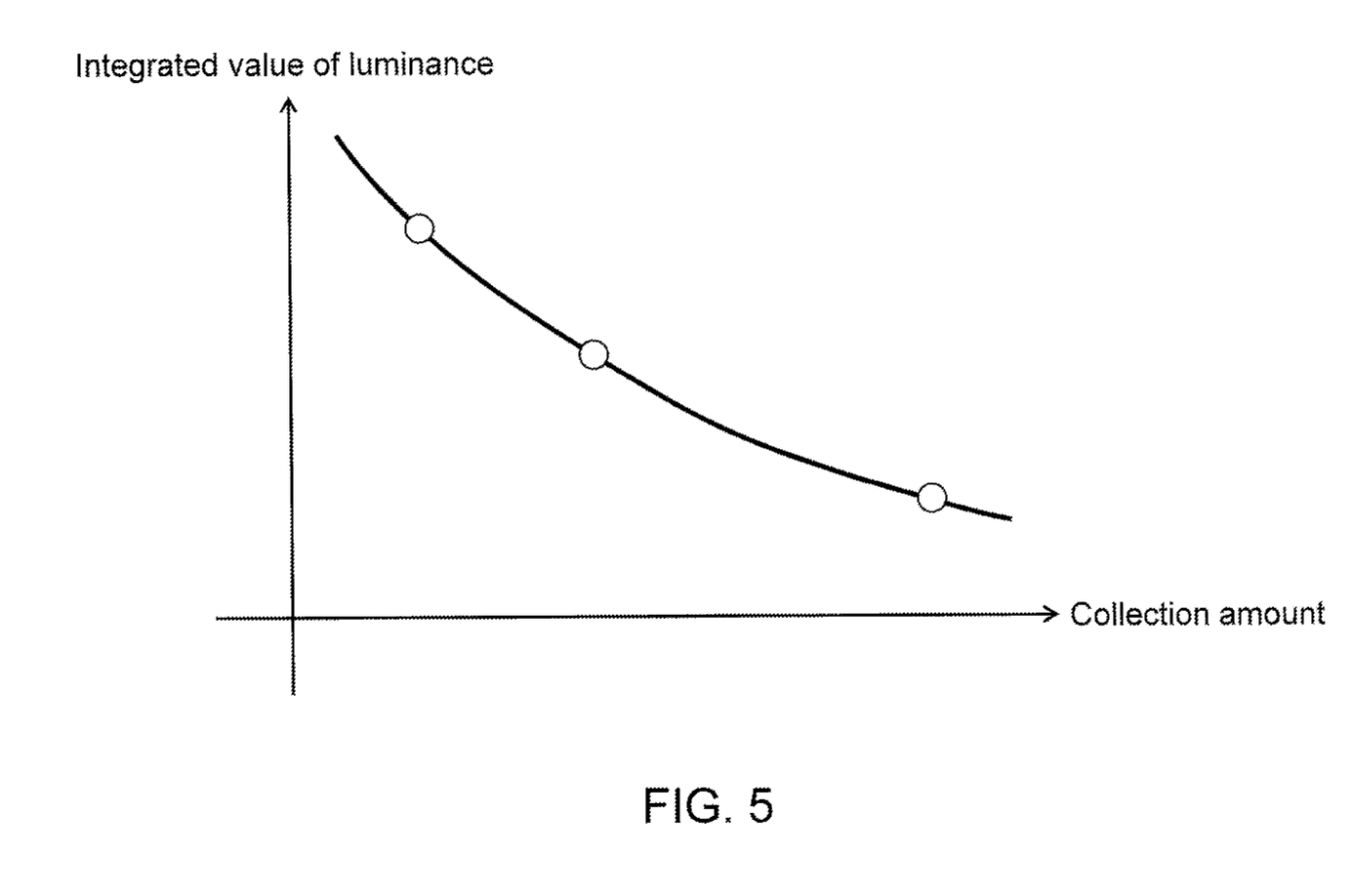
FIG. 5 is a diagram illustrating a relationship between an integrated value of a luminance of first image data and a collection amount of particulate matter.

Note that the relationship between the integrated value of the luminance of pixels included in the first image data IM1 and the collection amount of the particulate matter, which is shown in FIG. 5, is converted to a first calibration curve SC1 (FIG. 3) by converting the collection amount of the particulate matter into the content of the black carbon, and associating the integrated value of luminance and the content of black carbon with each other. The first calibration curve SC1 is in advance calculated as described above and stored in the storage device 43.

Specifically, the integrated value of the luminance of pixels included in the first image data IM1 is decreased along with an increase in the collection amount of the particulate matter. This decrease in the integrated value is mainly due to the increase of black color of black carbon contained in the particulate matter. Specifically, the integrated value of luminance decreases as the content of the black carbon increases. Thus, by integrating the luminance value of pixels included in the first image data IM1 after obtaining the image data, and comparing the first calibration curve SC1 with the calculated integrated value, content of black carbon contained in the particulate matter collected by the collection filter 1 can be calculated. Note that, also in the case where the infrared light filter 33b is disposed in front of the image sensor 31 so that the image sensor 31 obtains image data in the infrared region (the infrared image data), in the same manner as shown in FIG. 4, luminance of the first image data IM1 contained in the infrared image data is decreased along with an increase in the collection amount of the particulate matter. The infrared image data are image data obtained when infrared light reflected by the surface of the collection filter 1 is received by the image sensor 31. Therefore, the decrease in luminance of the first image data IM1 contained in the infrared image data along with an increase in the collection amount of the particulate matter FP means that the infrared light is absorbed by the particulate matter.

As described above, absorption of infrared light by the particulate matter is mainly due to organic carbon contained in the particulate matter. Therefore, similarly to the above case of the visible light image data, content of organic carbon contained in the particulate matter can be calculated, by using the integrated value of the luminance of pixels included in the first image data IM1 contained in the infrared image data, and a relationship between the integrated value of the first image data IM1 contained in the infrared image data and content of organic carbon (referred to as a second calibration curve SC2). Note that, similarly to converting the collection amount of the particulate matter to the content of black carbon, the content of organic carbon can be calculated by converting the collection amount of the particulate matter to the content of organic carbon. In addition, similarly to the first calibration curve SC1, the second calibration curve SC2 (FIG. 3) is obtained in advance and is stored in the storage device 43.

Figure 6:
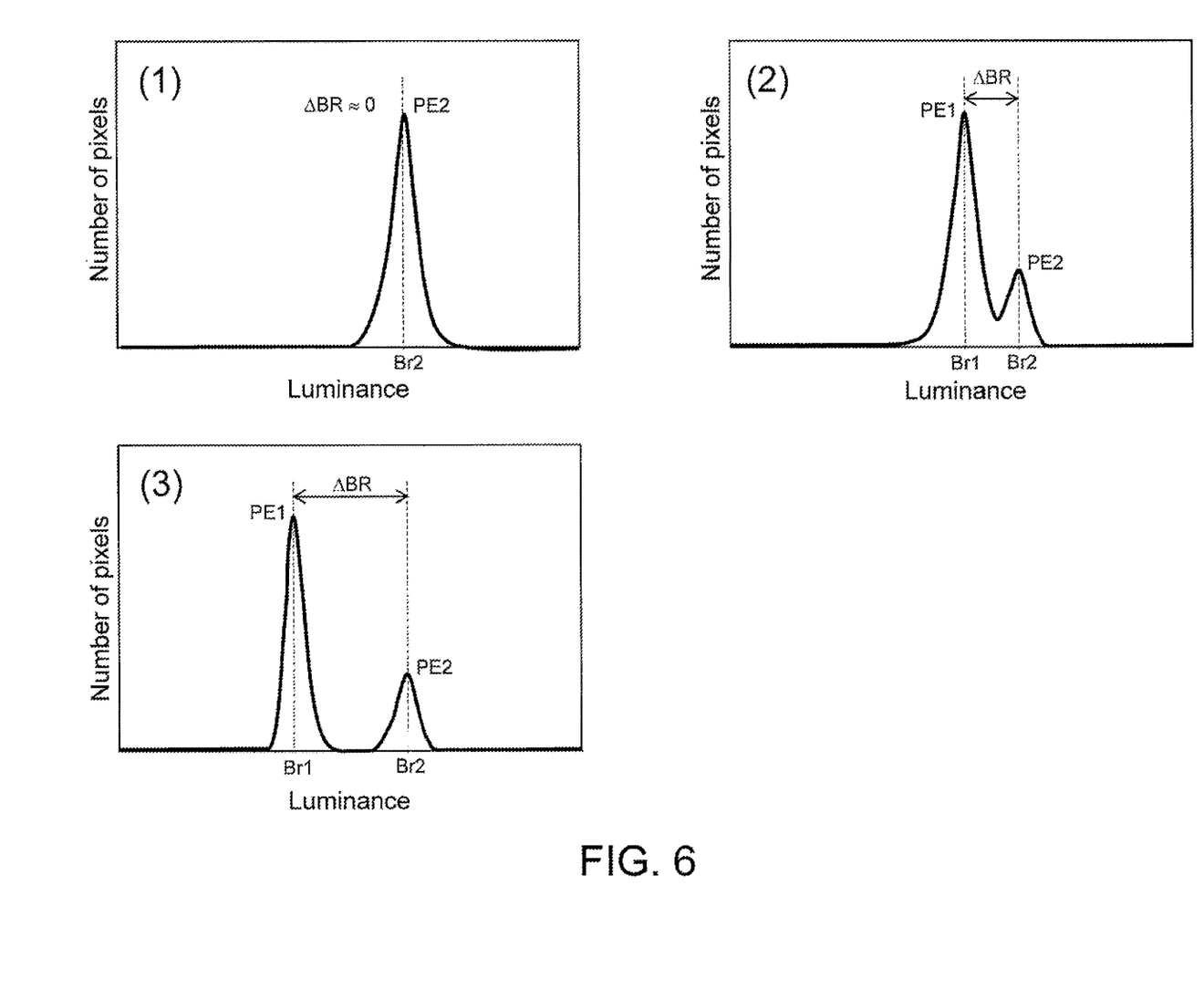
FIG. 6 is a diagram illustrating examples of a relationship between a luminance histogram and carbon compound content.

Other than the above-mentioned method, the carbon compound content can also be calculated on the basis of a luminance difference between the first image data IM1 and the second image data IM2, which is described in detail below. For instance, by associating luminance value included in the image data with the number of pixels having a specific luminance value in the image data for each of the image data (1) to (3) shown in FIG. 4, the histograms (1) to (3) shown in FIG. 6 are obtained (referred to as luminance histograms). FIG. 6 is a diagram illustrating examples of a relationship between the luminance histogram and the carbon compound content.

In other words, the luminance histogram (1) shown in FIG. 6 shows a case where no or little particulate matter is collected. The luminance histogram (3) shown in FIG. 6 shows a case where the collection amount of the particulate matter is large. The luminance histogram (2) shown in FIG. 6 shows a case where the collection amount of the particulate matter is medium. As shown in FIGS. 6 (2) and (3), two peaks, a first peak PE1 and a second peak PE2, are seen in the luminance histogram. A first luminance Br1 that represents a peak position of the first peak PE1 is smaller than a second luminance Br2 that represents a peak position of the second peak PE1 Since the luminance becomes smaller as the collection amount of the particulate matter increases, the first peak PE1 represents a distribution of luminance of pixels included in the first image data IM1 (the collection region of the particulate matter), and the second peak PE2 represents a distribution of luminance of pixels included in the second image data IM2 (other than collection region). Specifically, the first peak PE1 represents a relationship between a specific luminance of pixels included in the first image data IM1 and a number of the pixels having this specific luminance. On the other hand, the second peak PE2 represents a relationship between a specific luminance of pixels included in the second image data IM2 and a number of the pixels having this specific luminance.

In addition, in the luminance histograms shown in FIG. 6, a difference between the First luminance Br1 that is a peak position of the first peak PE1 and the second luminance Br2 that is a perk position of the second peak PE2, i.e. a luminance difference $\Delta BR$, becomes larger as the collection amount of the particulate matter increases. It should be noted that, since the second peak PE2 corresponds to the luminance distribution of the second image data IM2, the second luminance Br2 hardly changes in the luminance histogram. In contrast, as the collection amount of the particulate matter becomes larger, the first luminance Br1 is shifted to a lower luminance direction. Therefore, the luminance difference $\Delta BR$ is generated mainly due to the shift of the first luminance Br1 in accordance with the collection amount of the particulate matter.

In addition, the luminance histogram ((1) shown in FIG. 6) corresponding to the image data (1) shown in FIG. 4 has only one peak (PE2). This is because, when no or little particulate matter is collected, there is no or little difference between the luminance distribution of pixels included in the first image data IM1 and the luminance distribution of pixels included in the second image data IM2. In this way, by generating the luminance histogram shown in FIG. 6 from the image data obtained by the image sensor 31, and calculating the luminance difference $\Delta BR$ from a difference between the two peaks included in the luminance histogram, carbon compound content contained in the particulate matter can be calculated on the basis of the luminance difference $\Delta BR$. When calculating the content using the luminance histogram, the first calibration curve SC1 and the second calibration curve SC2 stored in the storage device 43 are data representing a relationship between the luminance difference $\Delta BR$ in the luminance histogram and the carbon compound content.

The calculation method of the content based on the luminance difference $\Delta BR$ described above is advantageous, in particular, in a case where a ratio between the first image data IM1 and the second image data IM2 in the image data can be changed, for example. It is because, even if a ratio between the first image data IM1 and the second image data IM2 in the image data is changed, luminance values at which the first peak PE1 and the second peak PE2 appear in the luminance histogram (the first luminance Br1 and the second luminance Br2) are not changed, and as a result, the luminance difference $\Delta BR$ is not changed by the ratio between the first image data IM1 and the second image data IM2. The change of the ratio between the first image data IM1 and the second image data IM2 can occur, for example, in a case where it is difficult to adjust position of the image sensor 31 so that the image data contains the entire collection region for the particulate matter, and/or a case where it is difficult to accurately control the movement amount of the collection filter 1 (to accurately move the collection region to the second position P2).

Figure 7:
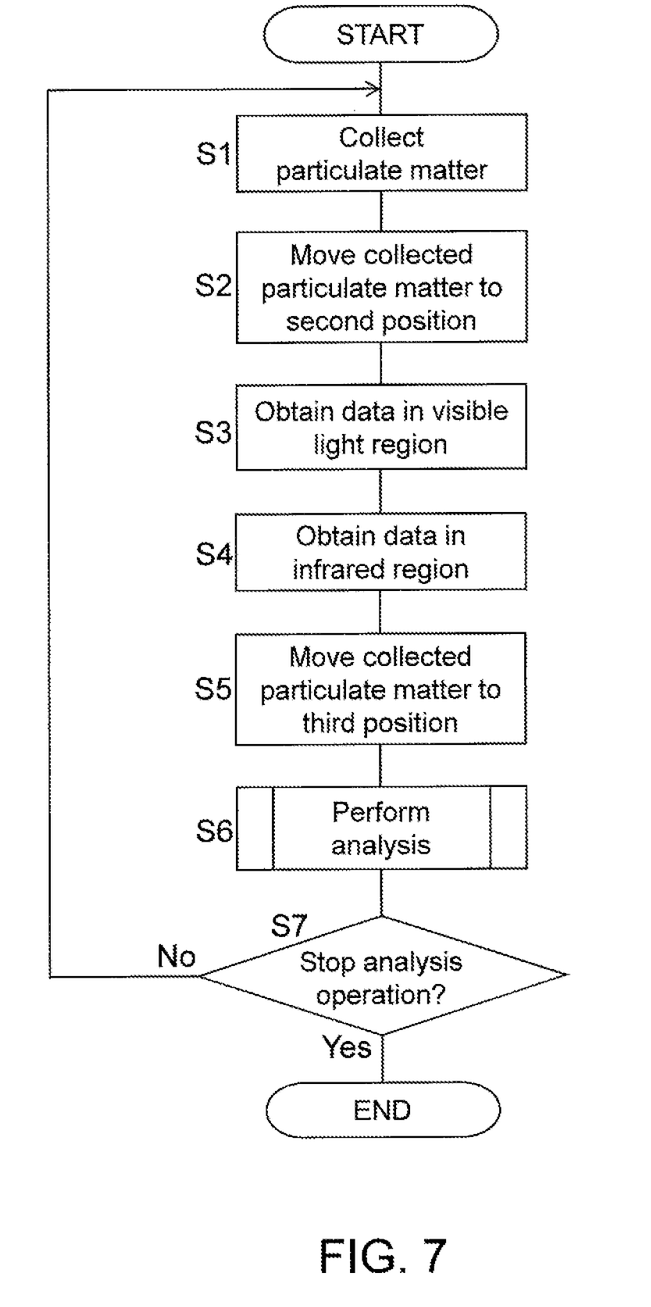
FIG. 7 is a flowchart illustrating operation of a representative analyzing apparatus or method according to one or more embodiments.
Figure 8:
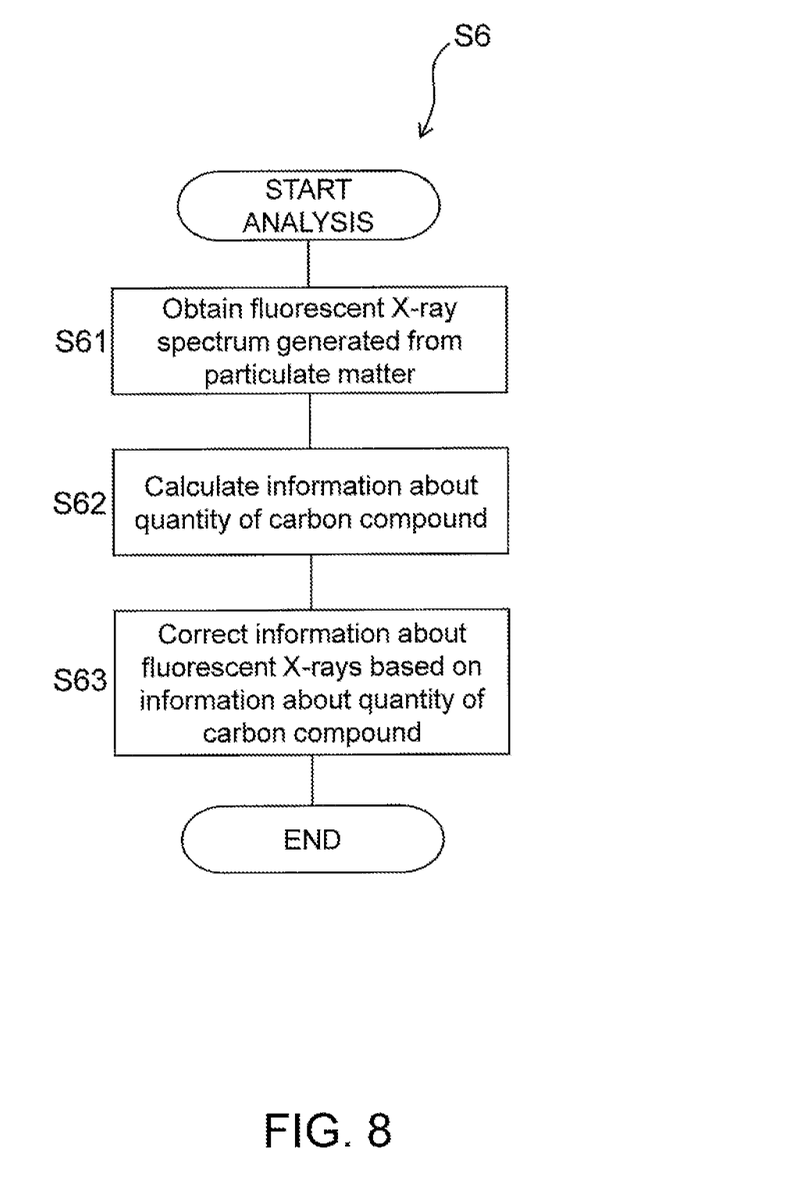
FIG. 8 is a flowchart illustrating a representative analysis operation of particulate matter for an apparatus or method according to one or more embodiments of the disclosure.

An operation of the analyzing apparatus 100 when analyzing the particulate matter is described below with reference to FIGS. 7 and 8. FIG. 7 is a flowchart showing an overall operation of an analyzing apparatus or method. FIG. 8 is a flowchart showing an analysis operation of the particulate matter. The analysis operation of the analyzing method or apparatus 100 starts from Step S1 in which the collection unit 5 collects the particulate matter in the air A at the first position P1 of the collection filter 1. The collection unit 5 collects the particulate matter with the collection filter 1 for a predetermined time (e.g. one hour). After Step S1, in Step S2, the collection filter 1 is moved so that the particulate matter at the first position P1 is moved to the second position P2.

After moving the particulate matter FP collected by the collection filter 1 to the second position P2, the optical characteristic measurement device 3 obtains data representing optical characteristics of the particulate matter on the collection filter 1 moved to the second position P2. In this embodiment, image data of the particulate matter is obtained as the data representing optical characteristics of the particulate matter. Specifically, data in the visible light region is first obtained in Step S3. More specifically, the region around the second position P2 of the collection filter 1 is irradiated with light by the light source 35, and the visible light filter 33a is disposed between the image sensor 31 and the collection filter 1. After that, the image sensor 31 obtains the visible light image data. Next, in Step S4, data in the infrared region is obtained. Specifically, the above-mentioned visible light filter 33a is replaced with the infrared light filter 33b. After that, the image sensor 31 obtains the infrared image data.

In this way, in this embodiment, the data in the visible light region (the visible light image data) and the data in the infrared region (the infrared image data) are obtained individually, as data representing optical characteristics of the particulate matter. This is because, since the absorption coefficient of X-rays in black carbon is different from that in organic carbon as described later, it is necessary to separately calculate influences of self-absorption caused by individual carbon compounds. After obtaining the data representing optical characteristics (the image data), in Step S5, the collection filter 1 is moved so that the particulate matter at the second position P2 is moved to the third position P3. After that, element analysis of the particulate matter is performed in Step S6.

In this embodiment, the element analysis of the particulate matter is performed in accordance with the flowchart shown in FIG. 8. The fluorescent X-ray spectrum obtained by the X-ray measurement device 2 is first corrected on the basis of the information about the quantity of carbon compound contained in the particulate matter FP, and then the element analysis is performed using the corrected fluorescent X-ray spectrum. First, in Step S61, the fluorescent X-ray spectrum generated from the particulate matter is obtained. Specifically, the X-ray source 21 irradiates the particulate matter with X-rays to generate fluorescent X-rays from the particulate matter, and the detector 23 detects the fluorescent X-rays. The calculation unit 4 associates the intensity of the fluorescent X-ray detected by the detector 23 with the energy value of the fluorescent X-rays to generate the fluorescent X-ray spectrum. After that, the calculation unit 4 corrects information about the obtained fluorescent X-ray spectrum on the basis of information about quantity of carbon compound contained in the particulate matter. In this embodiment, intensity of the obtained fluorescent X-ray spectrum is corrected on the basis of carbon compound content contained in the particulate matter. Specifically, the following Steps are performed.

First, in Step S62, the information about the quantity of carbon compound is calculated. Specifically, the calculation unit 4 calculates content of black carbon contained in the particulate matter using the data in the visible light region obtained in Step S3. In this embodiment, content of black carbon contained in the particulate matter is calculated, on the basis of the integrated value of the luminance of pixels included in the visible light image data or the luminance difference of the visible light image data. As described below, absorption of fluorescent X-rays is determined by thickness of the particulate matter (carbon compound) deposited on the collection filter 1. Therefore, the calculation unit 4 calculates "thickness of black carbon" on the collection filter 1 on the basis of the integrated value of the luminance of pixels included in visible light image data or the luminance difference $\Delta BR$ of the visible light image data. The thickness of black carbon described above is a hypothetical value calculated assuming that black carbon included in the particulate matter is evenly accumulated on the collection filter 1. The luminance difference $\Delta BR$ between the first image data IM1 and the second image data IM2 of the visible light image data is caused directly by thickness of black carbon on the collection filter 1. Therefore, the calculation unit 4 can directly calculate thickness of the particulate matter FP on the collection filter 1 on the basis of the visible light image data. Alter that, thickness (volume) and density of the black carbon are multiplied to calculate content of the black carbon. It should be noted that the density of black carbon is stored in the storage device 43 in advance.

In addition, the calculation unit 4 calculates content of the organic carbon contained in the particulate matter using the data in the infrared region obtained in Step S4. In this embodiment, content of the organic carbon contained in the particulate matter is calculated on the basis of the integrated value of the luminance of pixels included in the infrared image data or the luminance difference $\Delta BR$ of the infrared image data, similarly to the above. Note that the calculation unit 4 may calculate weight of the black carbon and weight of the organic carbon contained in the particulate matter. In this case, in the equation described below, an absorption coefficient $\mu 1$ (an absorption coefficient of the black carbon) and an absorption coefficient $\mu 2$ (an absorption coefficient of the organic carbon) are mass absorption coefficients. For instance, the absorption coefficients are calculated in advance using individual standard samples of black carbon and organic carbon (such as brown carbon, aromatic hydrocarbon, and unsaturated hydrocarbon) and a gray chart.

As described above, organic carbon includes brown carbon, aromatic hydrocarbon, unsaturated hydrocarbon, and the like, which have different optical characteristics from each other. Therefore, the absorption coefficient $\mu 2$ of organic carbon may be individual absorption coefficients $\mu 21$, $\mu 22$, $\mu 23$, . . . of compounds considered to be included as organic carbon. Next, in Step S63, the calculation unit 4 corrects information about fluorescent X-rays on the basis of information about quantity of carbon compound calculated in Step S62. Specifically, the calculation unit 4 corrects intensity of the fluorescent X-ray spectrum obtained in Step S61 using the following equation representing X-ray absorption. In the following equation, "I" represents intensity of the fluorescent X-rays that is actually measured, and $I_0$ represents intensity of fluorescent X-rays that is not affected by the self-absorption. In addition, q1 represents black carbon content, and q2 represents organic carbon content. Further, $\mu 1$ represents an absorption coefficient of black carbon, and $\mu 2$ represents an absorption coefficient of organic carbon:

$$I = I_0 * \exp(-(\mu 1 * q1 + \mu 2 * q2))$$

In this way, since the X-ray absorption coefficient in black carbon is different from that in organic carbon, by calculating the black carbon content (q1) and the organic carbon content (q2) separately, the amount of self-absorption of fluorescent X-rays in the particulate matter can be more correctly calculated.

The calculation unit 4 solves the above-mentioned equation representing absorption, for intensity $I_0$ of fluorescent X-rays that is not affected by the self-absorption, to derive the equation $I_0 = I * \exp(\mu 1 * q1 + \mu 2 * q2)$, substitutes the intensity of the fluorescent X-ray spectrum obtained in Step S61 for "I" in this equation, substitutes the black carbon content calculated in Step S62 for "q1", and substitutes the organic carbon content calculated in Step S63 for "q2". Thus, the calculation unit 4 calculates the corrected intensity $I_0$ of the fluorescent X-ray spectrum (namely, the intensity $I_0$ of fluorescent X-rays that is not influenced by the self-absorption). Note that, since the values of the absorption coefficients $\mu 1$ and $\mu 2$ are different depending on the energy value of X-rays, the calculation unit 4 performs the above-mentioned correction of intensity of the fluorescent X-ray spectrum for intensity of individual energy values included in the fluorescent X-ray spectrum. After that, the calculation unit 4 associates the energy value of fluorescent X-rays with the corrected intensity to generate the corrected fluorescent X-ray spectrum. Relationships between each value of absorption coefficients $\mu 1$ and $\mu 2$ and the energy value of X-rays are associated with each other and stored in the storage device 43.

After correcting, the fluorescent X-ray spectrum, the calculation unit 4 performs analysis (quantification) of elements contained in the particulate matter using the corrected fluorescent X-ray spectrum. Specifically, the calculation unit 4 specifies elements contained in the particulate matter on the basis of peak positions in the corrected fluorescent X-ray spectrum. In addition, from the intensity of fluorescent X-rays at this peak position, content (concentration) of the specified element is calculated.

After the analysis of the particulate matter is finished, if intended to continue the analysis operation ("No" in Step S7), the Steps S1 to S6 described above are performed again. In this way, the analyzing apparatus 100 of this embodiment can perform continuous analysis of the particulate matter. In contrast, when stopping the analysis operation ("Yes" in Step S7), the analysis operation is finished.

As described above, when performing analysis of a measurement object containing carbon compound such as particulate matter as a main component, the analyzing apparatus 100 of this embodiment can correct intensity of fluorescent X-rays obtained by the X-ray measurement device 2 on the basis of the carbon compound content. Thus, analysis of elements contained in the particulate matter can be performed accurately. The self-absorption by carbon compounds influences results of analysis of light elements (such as calcium (Ca), aluminum (Al), silicon (Si), and potassium (K)) contained in the measurement object, in particular. It is because the X-ray absorption by carbon compounds becomes large on a low energy side, and a light element has a peak position of fluorescent X-rays on a relatively low energy side.

Therefore, by accurately correcting the measured intensity of fluorescent X-rays on the basis of the carbon compound content contained in the measurement object, analysis of light elements in particular can be accurately performed. As a result, a source of the measurement object can also be accurately grasped on the basis of the accurate analysis results of light elements. In addition, by using the data representing optical characteristics of carbon compounds contained in the particulate matter, such as the visible light image data or the infrared image data, the carbon compound content contained in the particulate matter can be accurately calculated on the basis of the optical characteristics of carbon compound.

The claimed subject matter is not limited to the embodiment described above, and various modifications can be made within the scope of the disclosure. In particular, a plurality of embodiments and variations described in this specification can be arbitrarily combined as necessary for particular applications. Furthermore, in the analysis operation described above with reference to the flowcharts of FIGS. 7 and 8, the order of the Steps and/or process of the Steps can be appropriately modified for various applications or implementations. Similarly, a sensor capable of measuring optical characteristics of carbon compounds in the infrared region, such as an infrared sensor, for example, may be used as the optical characteristic measurement device 3. A sensor capable of measuring optical characteristics of carbon compounds in the visible light region, such as a visible light sensor, may be used as the optical characteristics measurement device 3. An infrared sensor and a visible light sensor may be combined to be used as the optical characteristic measurement device 3. Only one of the infrared sensor and the visible light sensor may be used as the optical characteristic measurement device 3. A sensor capable of measuring absorption or reflection of infrared rays, such as a thermopile sensor or a flow sensor, can be used as the infrared sensor, for example. A sensor capable of measuring, absorption or reflection of visible light, such as a photodiode, can be used as the visible light sensor, for example. The optical characteristic measurement device 3 may be a combination of a grating (diffraction grating) and a sensor array. In this case, the grating separates light from the particulate matter FP into light components having individual wavelengths. The sensor array is an array of sensors in which a plurality of optical sensors are arranged in an array (a linear array) to measure intensity of the light components having individual wavelengths separated by the grating. The optical characteristic measurement device 3 may obtain light from the particulate matter FP as a spectrum. It may be possible to determine whether or not black carbon is contained and whether or not organic carbon is contained on the basis of peak positions in the spectrum, and to calculate content of the carbon compound on the basis of peak intensity.

The light source 35 is not limited to a white color light source. The light source 35 may be a plurality of light sources, each emitting different wavelength regions of light. For instance, a white color light source may be used when obtaining visible light image data, and an infrared light source (e.g. an infrared lamp) may be used when obtaining infrared image data. In addition, the light source 35 may be a laser oscillator or an LED that emits light having a specific wavelength.

The correction of intensity of fluorescent X-rays based on optical characteristics of the measurement object described above can be applied to other measurement objects than carbon compounds, in which the main component has characteristics unique to the black color region or the infrared region. For instance, it can be applied to analysis of impurity elements contained in a measurement object having colors other than black and white, such as toner or powdery food. In this case, a filter that transmits light having a color reflected or absorbed by the measurement object is used as the light filter 33.

The image sensor 31 may be a sensor that measures intensity of reflected light from the particulate matter on the collection filter 1, other than the CCD sensor. Likewise, the light filter 33 may be a filter that cuts off light in a specific wavelength region. For instance, it may be possible to detect light from the particulate matter in the visible light region by disposing, the light filter 33 that cuts off light in the infrared region, and to detect light in the visible light region and light in the inflated region by removing the light filter 33. The light filter 33 may be a plurality of light filters that transmit light in various wavelength regions. In this case, it is possible to specify a type of the included carbon compound and content of the carbon compound on the basis of where or not light from the particulate matter is detected when disposing each of the filters.

The collection amount measurement unit 6 is not limited to a combination of the beta-ray source 61 and the beta-ray detector 63. The collection amount measurement unit 6 may be a combination of a LED or a laser oscillator and a light scattering detector, for example. In other words, the collection amount measurement unit 6 may use light scattered by the particulate matter collected by the collection filter 1 to measure mass concentration of the particulate matter.

Other than the intensity of the fluorescent X-ray spectrum, for example, a qualification result and/or a quantification result obtained by using the fluorescent X-ray spectrum can also be corrected on the basis of information about quantity of carbon compound as information about fluorescent X-rays. On the basis of optical characteristics measured by the optical characteristic measurement device 3, it is also possible to calculate thickness (or a value corresponding to thickness) of carbon compound deposited on the collection filter 1, transmittance/reflectance of X-rays, or the like, for example, as information about quantity of carbon compound.

INDUSTRIAL APPLICABILITY

Embodiments of the claimed subject matter can be widely applied to analyzing apparatuses for obtaining information about elements contained in a measurement object on the basis of fluorescent X-rays generated from the measurement object.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments within the scope of the claimed subject matter that may not be explicitly described or shown.

What is claimed is:

1. An analyzing apparatus configured to analyze a measurement object on the basis of fluorescent X-rays generated from the measurement object, the apparatus comprising:
   an X-ray measurement device configured to measure the fluorescent X-rays and obtain fluorescent X-ray information;
   an optical characteristic measurement device configured to obtain optical characteristics other than the fluorescent X-rays of a carbon compound contained in the measurement object; and
   a calculation unit configured to calculate quantity information about a quantity of the carbon compound contained in the measurement object on the basis of the optical characteristics of the carbon compound, and to correct the fluorescent X-ray information on the basis of the calculated quantity information about the quantity of the carbon compound.

2. The analyzing apparatus of claim 1, wherein the optical characteristic measurement device includes a sensor configured to measure optical characteristics of the measurement object.

3. The analyzing apparatus of claim 2, wherein the sensor is an image sensor configured to obtain image data of the measurement object.

4. The analyzing apparatus of claim 3, wherein the optical characteristic measurement device comprises a light filter disposed between the sensor and the measurement object.

5. The analyzing apparatus of claim 2, wherein the optical characteristic measurement device comprises a light source configured to irradiate the measurement object with light.

6. The analyzing apparatus of claim 5, wherein the light source comprises a white color light source.

7. The analyzing apparatus of claim 1, wherein the calculation unit calculates black carbon content contained in the measurement object on the basis of the optical characteristics of the carbon compound in a visible light region.

8. The analyzing apparatus of claim 1, wherein the calculation unit calculates organic carbon content contained in the measurement object on the basis of the optical characteristics of the carbon compound in a visible light region.

9. The analyzing apparatus of claim 1, wherein the calculation unit calculates organic carbon content contained in the measurement object on the basis of the optical characteristics of the carbon compound in an infrared region.

10. The analyzing apparatus of claim 1, wherein the calculation unit calculates black carbon content contained in the measurement object on the basis of the optical characteristics of the carbon compound in an infrared region.

11. The analyzing apparatus according to claim 1, further comprising a collection filter configured to collect the measurement object.

12. A method for analyzing a measurement object, the method comprising:
    detecting fluorescent X-rays generated by the measurement object to obtain fluorescent X-ray information;
    obtaining optical characteristics other than the fluorescent X-rays of a carbon compound contained in the measurement object;
    calculating quantity information about a quantity of the carbon compound contained in the measurement object on the basis of the optical characteristics of the carbon compound; and
    correcting the fluorescent X-ray information on the basis of the quantity information about the quantity of the carbon compound.

13. A non-transitory computer readable storage product having stored data representing a program causing a computer to perform a method for analyzing a measurement object on the basis of fluorescent X-rays generated from by the measurement object, the method comprising:
    detecting the fluorescent X-rays;
    obtaining optical characteristics other than the fluorescent X-rays of a carbon compound contained in the measurement object;
    calculating a quantity of the carbon compound contained in the measurement object on the basis of the optical characteristics of the carbon compound; and
    correcting information about the fluorescent X-rays on the basis of the quantity of the carbon compound.

* * * * *

UNITED STATES PATENT AND TRADEMARK OFFICE
CERTIFICATE OF CORRECTION

PATENT NO. : 11,293,885 B2
APPLICATION NO. : 16/676862
DATED : April 5, 2022
INVENTOR(S) : Yusuke Mizuno et al.

It is certified that error appears in the above-identified patent and that said Letters Patent is hereby corrected as shown below:

In the Claims

Column 18, Line 31, Claim 13:
After "on the basis of fluorescent X-rays generated"
Delete "from".

Signed and Sealed this
Sixteenth Day of August, 2022

Katherine Kelly Vidal
Director of the United States Patent and Trademark Office